United States Patent
Patterson et al.

(10) Patent No.: US 12,543,286 B2
(45) Date of Patent: Feb. 3, 2026

(54) STORAGE DEVICE CARRIER AND LATCHING MECHANISM

(71) Applicant: Western Digital Technologies, Inc., San Jose, CA (US)

(72) Inventors: Scott R. Patterson, Manitou Springs, CO (US); Andrew Altermatt, Colorado Springs, CO (US); Jeffrey D. Wilke, Palmer Lake, CO (US)

(73) Assignee: Western Digital Technologies, Inc., San Jose, CA (US)

( * ) Notice: Subject to any disclaimer, the term of this patent is extended or adjusted under 35 U.S.C. 154(b) by 128 days.

(21) Appl. No.: 18/225,652

(22) Filed: Jul. 24, 2023

(65) Prior Publication Data

US 2024/0373580 A1 Nov. 7, 2024

Related U.S. Application Data

(60) Provisional application No. 63/463,254, filed on May 1, 2023.

(51) Int. Cl.
*G11B 23/03* (2006.01)
*G06F 1/18* (2006.01)
(Continued)

(52) U.S. Cl.
CPC ........... *H05K 7/1489* (2013.01); *G06F 1/187* (2013.01); *G11B 33/025* (2013.01);
(Continued)

(58) Field of Classification Search
CPC ........ G06F 1/1658; G06F 1/184; G06F 1/185; G06F 1/186; G06F 1/187; G11B 33/12;
(Continued)

(56) References Cited

U.S. PATENT DOCUMENTS

| 5,641,296 A | 6/1997 | Larabell et al. |
|---|---|---|
| 5,765,933 A | 6/1998 | Paul et al. |

(Continued)

FOREIGN PATENT DOCUMENTS

| CN | 201051399 Y | 4/2008 |
|---|---|---|
| WO | WO1996000938 A1 | 1/1996 |

OTHER PUBLICATIONS

Western Digital, Ultrastar® Data60, Aug. 2022, 2 pages, downloaded at https://documents.westerndigital.com/content/dam/doc-library/en_us/assets/public/western-digital/product/platforms/ultrastar-data60-hybrid-platform/product-brief-ultrastar-data60-hybrid-storage-platform.pdf.

(Continued)

*Primary Examiner* — Adrian S Wilson
*Assistant Examiner* — Gage Crum
(74) *Attorney, Agent, or Firm* — John D. Henkhaus

(57) ABSTRACT

A device carrier mechanism configured for attachment to an electronic device such as a hard disk drive includes a pair of rotatable handles interlocked at a common first pivot at a proximal end of each handle and a respective second pivot at a distal end, a pair of pin mechanisms each coupled at the second pivot of a respective handle and having a protruding latch pin, and a frame with which each pin mechanism is translatably coupled. Such a linkage system operates as an over-center mechanism, in a device handling state responsive to an upward handling force and with the latch pins in a retracted position within the frame, a neutral state with the latch pins in an extended position extending external to the frame, and a locked over-center state with the latch pins clamped in the extended position for locking into a data storage system.

20 Claims, 13 Drawing Sheets

(51) Int. Cl.
  *G11B 23/04* (2006.01)
  *G11B 33/02* (2006.01)
  *G11B 33/04* (2006.01)
  *G11B 33/12* (2006.01)
  *H05K 7/14* (2006.01)

(52) U.S. Cl.
  CPC .......... *G11B 33/124* (2013.01); *G11B 33/126* (2013.01); *G11B 33/128* (2013.01); *H05K 7/1487* (2013.01)

(58) Field of Classification Search
  CPC ... G11B 33/123; G11B 33/124; G11B 33/126; G11B 33/128; H05K 7/1409; H05K 7/1487; H05K 7/1488; H05K 7/1489
  See application file for complete search history.

(56) References Cited

U.S. PATENT DOCUMENTS

| | | | |
|---|---|---|---|
| 6,231,145 B1 | 5/2001 | Liu | |
| 6,252,514 B1 * | 6/2001 | Nolan | G11B 33/128 361/170 |
| 6,270,174 B1 * | 8/2001 | Nishi | G06F 1/181 |
| 6,325,353 B1 | 12/2001 | Jiang | |
| 6,351,379 B1 * | 2/2002 | Cheng | G11B 33/128 |
| 7,027,309 B2 * | 4/2006 | Franz | H01R 13/62933 361/740 |
| 7,423,869 B2 * | 9/2008 | Su | G06F 1/187 361/679.33 |
| 7,443,668 B2 * | 10/2008 | Hsu | G11B 33/12 |
| 7,540,574 B2 * | 6/2009 | Wu | G11B 33/128 312/223.2 |
| 8,644,034 B2 * | 2/2014 | Zheng | G06F 1/181 361/818 |
| 9,152,189 B2 * | 10/2015 | Fan | G06F 1/187 |
| 9,558,789 B1 * | 1/2017 | Van Pelt | G06F 1/187 |
| 9,870,804 B2 * | 1/2018 | Niss | G11B 33/128 |
| 10,534,411 B2 * | 1/2020 | Spencer | G06F 1/187 |
| 10,537,035 B2 | 1/2020 | Adrian et al. | |
| 10,566,030 B2 | 2/2020 | Jau et al. | |
| 10,910,019 B2 | 2/2021 | Niss et al. | |
| 11,329,429 B2 * | 5/2022 | Bell | H01R 13/62966 |
| 11,809,212 B2 * | 11/2023 | Lin | G06F 1/187 |
| 2003/0099094 A1 * | 5/2003 | Coles | H05K 7/1409 361/679.33 |
| 2003/0178921 A1 | 9/2003 | Wojcik | |
| 2004/0119294 A1 * | 6/2004 | Long | E05C 1/145 292/83 |
| 2005/0243534 A1 * | 11/2005 | Robertson | G06F 1/184 361/801 |
| 2007/0230105 A1 | 10/2007 | Su | |
| 2009/0296344 A1 * | 12/2009 | Tu | G06F 1/187 361/679.57 |
| 2010/0172086 A1 * | 7/2010 | Chen | G11B 33/128 361/679.33 |
| 2010/0309621 A1 * | 12/2010 | Chang | G06F 1/187 361/679.33 |
| 2017/0185111 A1 | 6/2017 | Yu et al. | |
| 2019/0246514 A1 * | 8/2019 | Hill | G11B 33/0433 |
| 2021/0198926 A1 * | 7/2021 | Tsorng | E05C 1/12 |
| 2024/0138092 A1 * | 4/2024 | Lin | G11B 33/124 |

OTHER PUBLICATIONS

Western Digital, User Guide, Ultrastar® Data60, Revision 07, Jun. 2023, 321 pages, Section 2.9 pp. 49-50, downloaded at https://documents.westerndigital.com/content/dam/doc-library/en_us/assets/public/western-digital/product/platforms/ultrastar-data60-hybrid-platform/user-guide-ultrastar-data60.pdf.
Korean Intellectual Property Office (ISA/KR), PCT International Search Report and Written Opinion for counterpart International application No. PCT/US2023/084605, Apr. 26, 2024, 7 pages.

* cited by examiner

APPLY AN UPWARD HANDLING FORCE TO THE HANDLES THEREBY MOVING THE CARRIER AND LATCHING MECHANISM TO A DEVICE HANDLING STATE CORRESPONDING TO THE COMMON FIRST PIVOT BEING POSITIONED SUBSTANTIALLY ABOVE THE SECOND PIVOTS WITH THE LATCH PINS IN A RETRACTED POSITION WITHIN THE FRAME
802

POSITION THE STORAGE DEVICE WITH THE ATTACHED CARRIER AND LATCHING MECHANISM OVER AN INSTALLATION SLOT OF A STORAGE SYSTEM ENCLOSURE
804

LOWER THE STORAGE DEVICE INTO THE INSTALLATION SLOT UNTIL CONNECTED TO THE ENCLOSURE
806

RELEASE THE HANDLES THEREBY MOVING THE CARRIER AND LATCHING MECHANISM TO A NEUTRAL STATE CORRESPONDING TO THE COMMON FIRST PIVOT BEING POSITIONED ABOVE THE SECOND PIVOTS WITH THE LATCH PINS IN AN EXTENDED POSITION EXTENDING EXTERNAL TO THE FRAME
808

APPLY A DOWNWARD LOCKING FORCE TO THE HANDLES IN THE NEUTRAL STATE THEREBY MOVING THE CARRIER AND LATCHING MECHANISM TO A LOCKED OVER-CENTER STATE CORRESPONDING TO THE COMMON FIRST PIVOT BEING SUBSTANTIALLY OR NEARLY COPLANAR WITH THE SECOND PIVOTS, IN WHICH THE HANDLES ARE CONSTRAINED FROM FURTHER MECHANICAL MOVEMENT DOWNWARD AND ARE LONGITUDINALLY COMPRESSED AT LEAST IN PART BY OUTER WALLS OF THE FRAME, AND WITH THE LATCH PINS IN THE EXTENDED POSITION
810

FIG. 8

STORAGE DEVICE CARRIER AND LATCHING MECHANISM

FIELD OF EMBODIMENTS

Embodiments of the invention may relate generally to the handling of data storage devices and particularly to an ergonomic storage device carrier mechanism.

BACKGROUND

As networked computer systems grow in numbers and capability, there is a need for more storage system capacity. Cloud computing and large-scale data processing further increase the need for digital data storage systems that are capable of transferring and holding significant amounts of data. One approach to providing sufficient data storage is the use of arrays of data storage devices (DSDs) in data centers. Many DSDs can be housed in an electronics enclosure (sometimes referred to as a "rack"), which is typically a modular unit that can hold and operate independent DSDs in an array, computer processors, routers and other electronic equipment. As data centers typically include many rack-mountable storage devices that are used to store the large amounts of data, a non-trivial amount of device handling may be necessary and, therefore, associated user fatigue may occur.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 8 is a flow diagram illustrating a method of using a carrier and latching mechanism attached to a storage device, according to an embodiment.

DETAILED DESCRIPTION

Figure 1A:
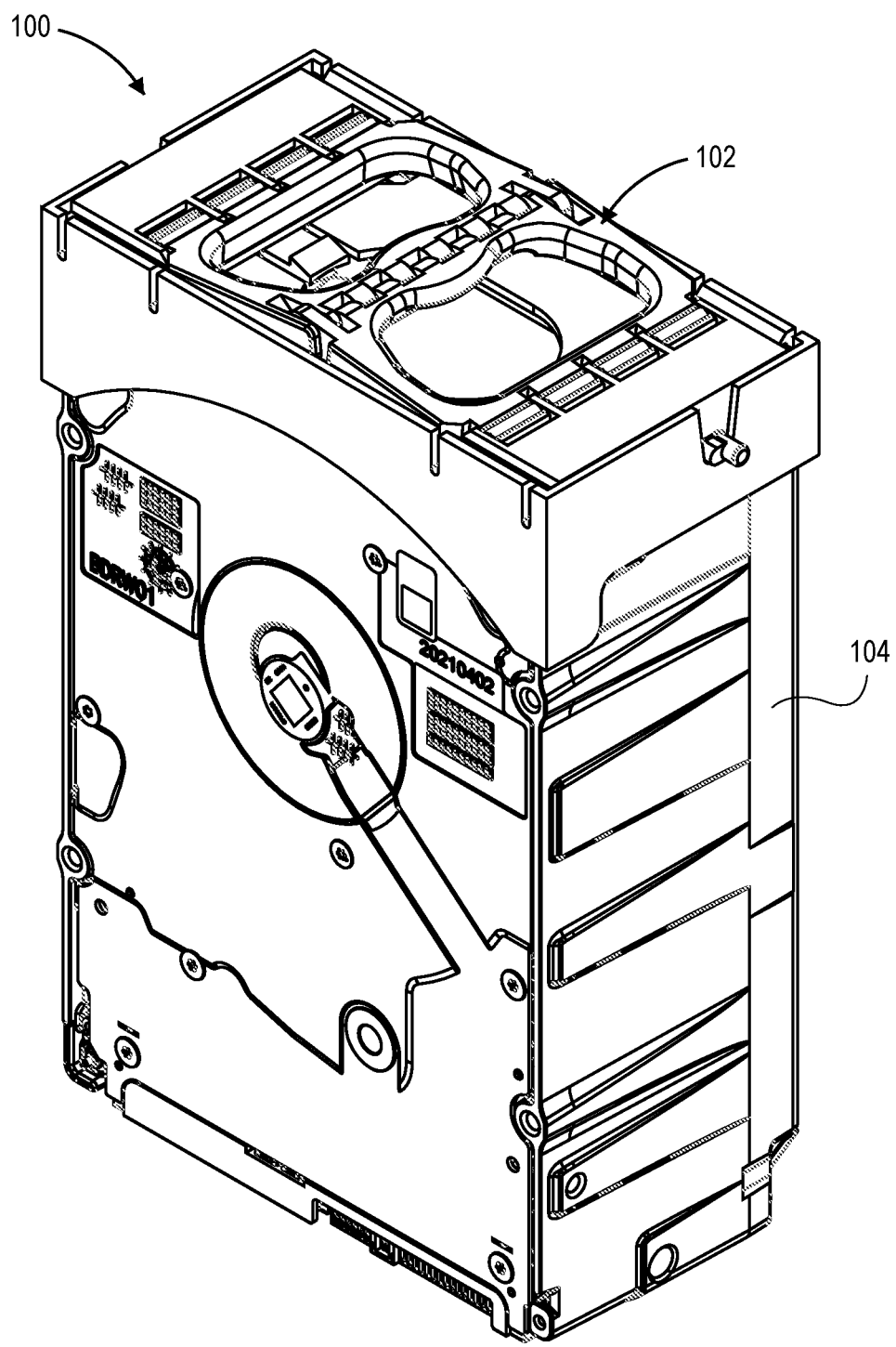
FIG. 1A is a perspective view illustrating a storage device carrier mechanism coupled with a storage device, according to an embodiment.

Generally, approaches to a storage device carrier and latching mechanism, such as for large form factor hard disk drives (HDDs), are described. In the following description, for the purposes of explanation, numerous specific details are set forth to provide a thorough understanding of the embodiments of the invention described herein. It will be apparent, however, that the embodiments of the invention described herein may be practiced without these specific details. In other instances, well-known structures and devices are shown in block diagram form to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment or to every embodiment.

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the structure is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Recall that data centers typically include many rack-mountable storage devices (e.g., DSDs) which require handling which may, in turn, be the cause of associated user fatigue such as that associated with installing multiple storage devices into a data storage system. For example, a known approach uses a mechanical assembly that requires the user to squeeze spring-loaded recessed sliding buttons to install and release the storage device from the storage system. This provides a beneficial single action but users mention the fatigue of having to compress the buttons when large numbers of storage devices are installed into a storage system. Furthermore, increasing the storage capacity of storage devices such as hard disk drives (HDDs) is one of the on-going goals of HDD technology evolution. In one form, this goal manifests in increasing the number of disks implemented in a given HDD. However, such an approach certainly adds weight to an HDD, if not ultimately leading to the need for a device having a larger form factor (e.g., a thicker device, in the disk stack direction, than a common 1-inch in height form factor). The aforementioned approach would be difficult to use on larger and heavier HDDs, as users may be challenged to lift such devices from the storage system because they could weigh around twice as much as current HDDs. Other known approaches use a cam lever with a lock switch/button, which are single-action to lock but typically double-action to release (e.g., first push the unlock button then lift up on the lever cam to fully release and lift). Cam lever type of mechanical assemblies typically have a short cam lever, which is not positioned over the center of gravity of the storage device, so while lifting of current HDDs may be manageable this activity would be difficult for larger and heavier HDDs. Thus, there is a challenge with increasing the number of disks in an HDD while maintaining ergonomic handleability.

Operating Context

FIG. 1A is a perspective view illustrating a storage device carrier mechanism coupled with a storage device, according to an embodiment. Storage device assembly 100 ("assembly 100") comprises a storage device carrier and latching mechanism 102 ("carrier mechanism 102") attached to a storage device 104, such as an extended form-factor (e.g., greater than 1 inch thick) hard disk drive (HDD) or solid-state drive (SSD). As is described in more detail elsewhere herein, the carrier mechanism 102 is attached to one end of the storage device 104, and comprises an over-center mechanism having two handles (see, e.g., handles 202 of FIGS. 2A-2B) configured for handling (e.g., lifting, carrying, inserting, installing, removing, and the like) the storage device 104, each of which is coupled with a respective pin mechanism (see, e.g., pin mechanisms 204 of FIGS. 2A-2B) configured to latch or temporarily lock assembly 100 into a data storage system.

Figure 1B:
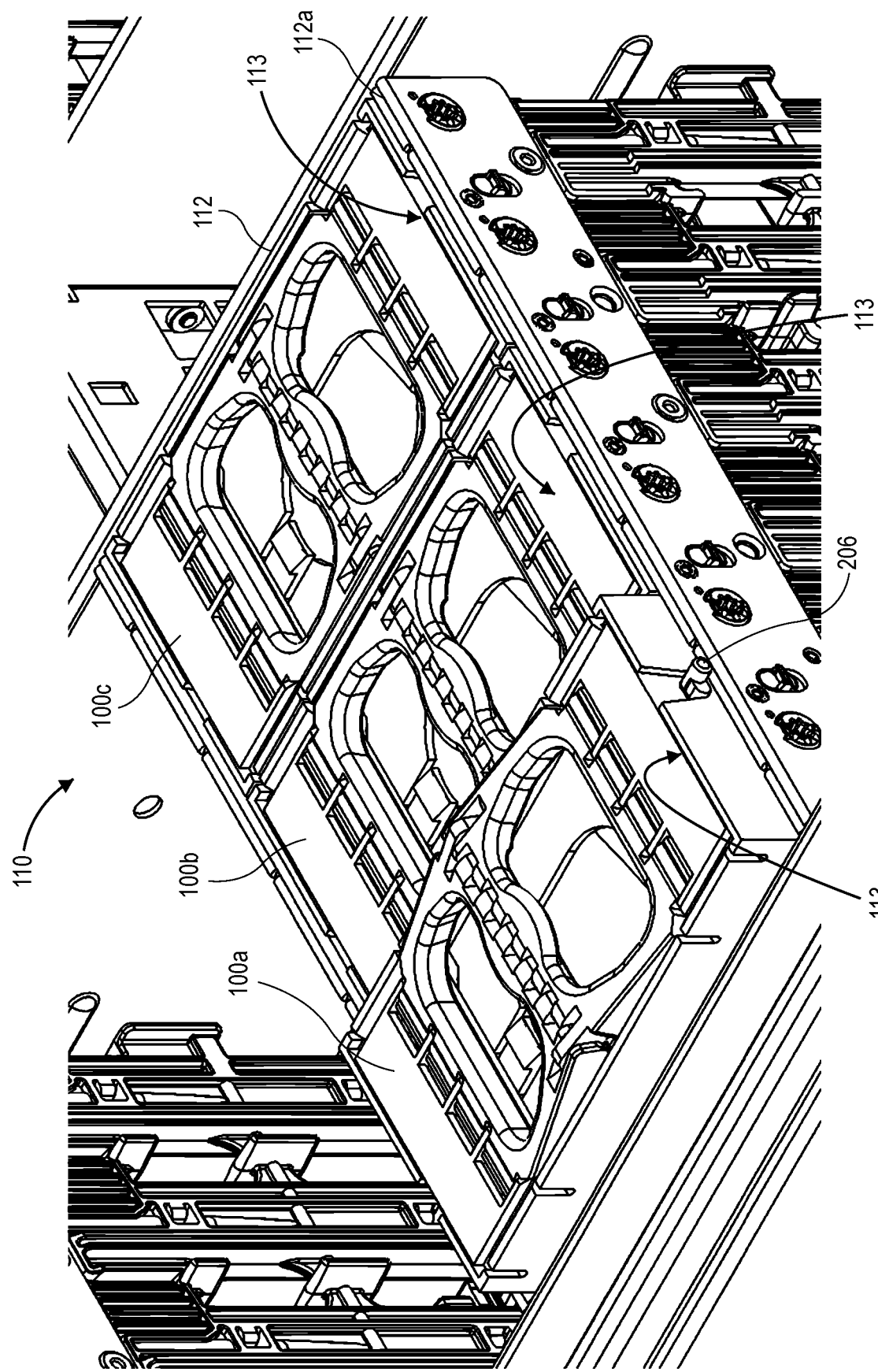
FIG. 1B is a perspective view illustrating a plurality of storage device assemblies inserted in a storage system, according to an embodiment.

FIG. 1B is a perspective view illustrating a plurality of storage device assemblies inserted in a storage system, according to an embodiment. As depicted here, data storage system 110 comprises a plurality of storage device assemblies 100a, 100b, 100c (see, e.g., assembly 100 FIG. 1A) each inserted into an electronics equipment rack, such as in a respective slot 113 of a system enclosure 112. As depicted in FIG. 1B, assemblies 100b, 100c are each completely installed (e.g., mechanically and electrically connected with) into the system enclosure 112, whereby respective latch pins (see, e.g., latch pins 206 of pin mechanisms 204 of FIGS. 2A-2B) are extended into respective receptacles of the system enclosure 112. For example, the latch pins may mechanically mate with a corresponding aperture and/or grommet of a divider assembly 112a, panel, or component of the system enclosure 112, which may be configured so as to provide some reactive force to each assembly 100. By contrast, as depicted assembly 100a is not completely installed into the system enclosure 112, as its latch pins 206 (FIGS. 2A-2B) are not extended into respective receptacles of the system enclosure 112 but are resting upon some structure of the system enclosure 112. This is an intentional albeit temporary state for assembly 100a to illustrate one feature of carrier mechanism 102, whereby the latch pins can function to prohibit any assembly 100 from being dropped into the system enclosure, such as when the carrier mechanism 102 is not being appropriately utilized, and for example thereby risking damaging respective electrical connectors constituent to the storage device 104 or the system enclosure 112. Here, the carrier mechanism 102 of assembly 100a is in a physical state referred to elsewhere herein as a neutral state of such over-center mechanism.

Storage Device Carrier and Latching Mechanism

Figure 2A:
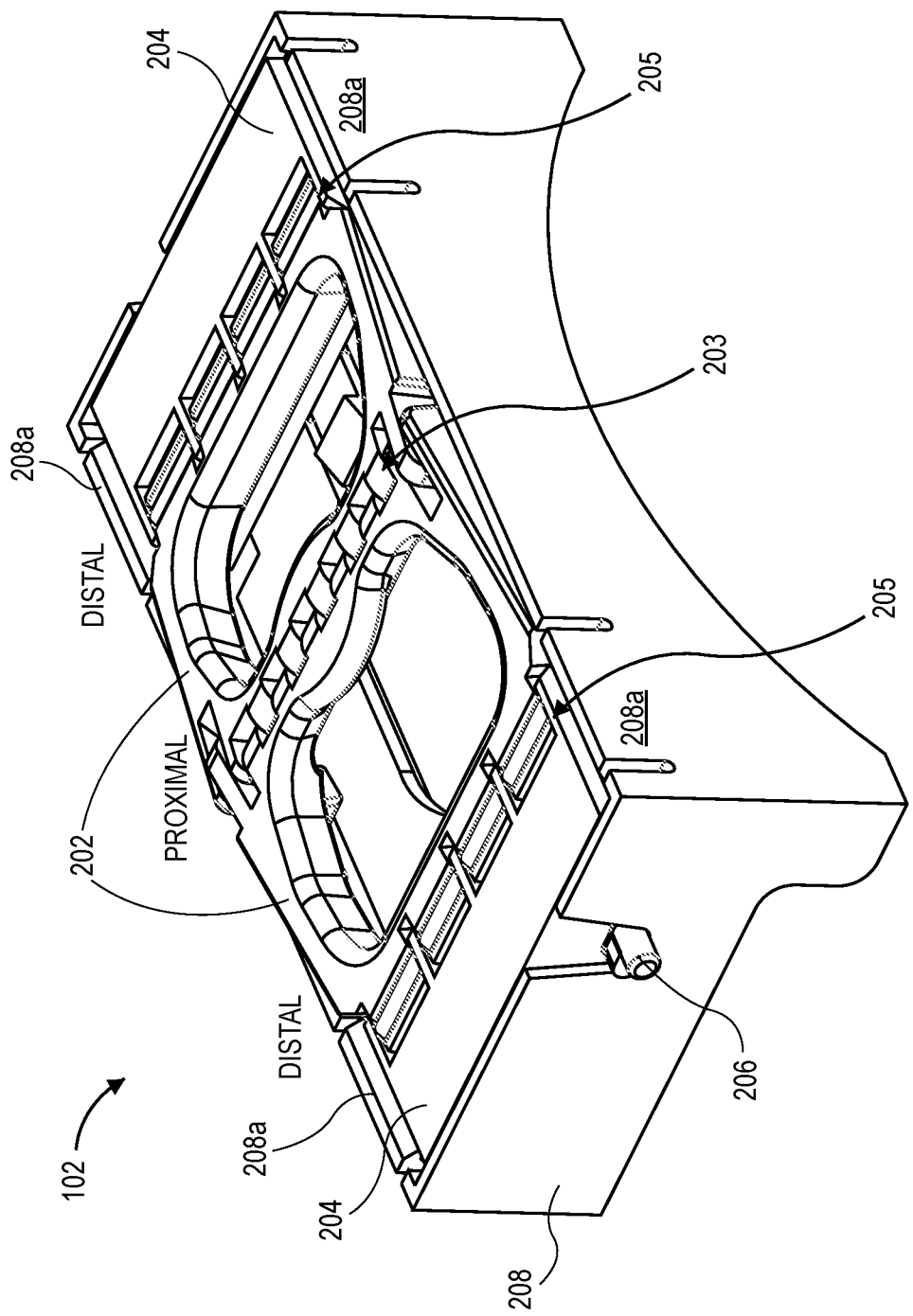
FIG. 2A is a perspective view illustrating a storage device carrier mechanism, according to an embodiment.
Figure 2B:
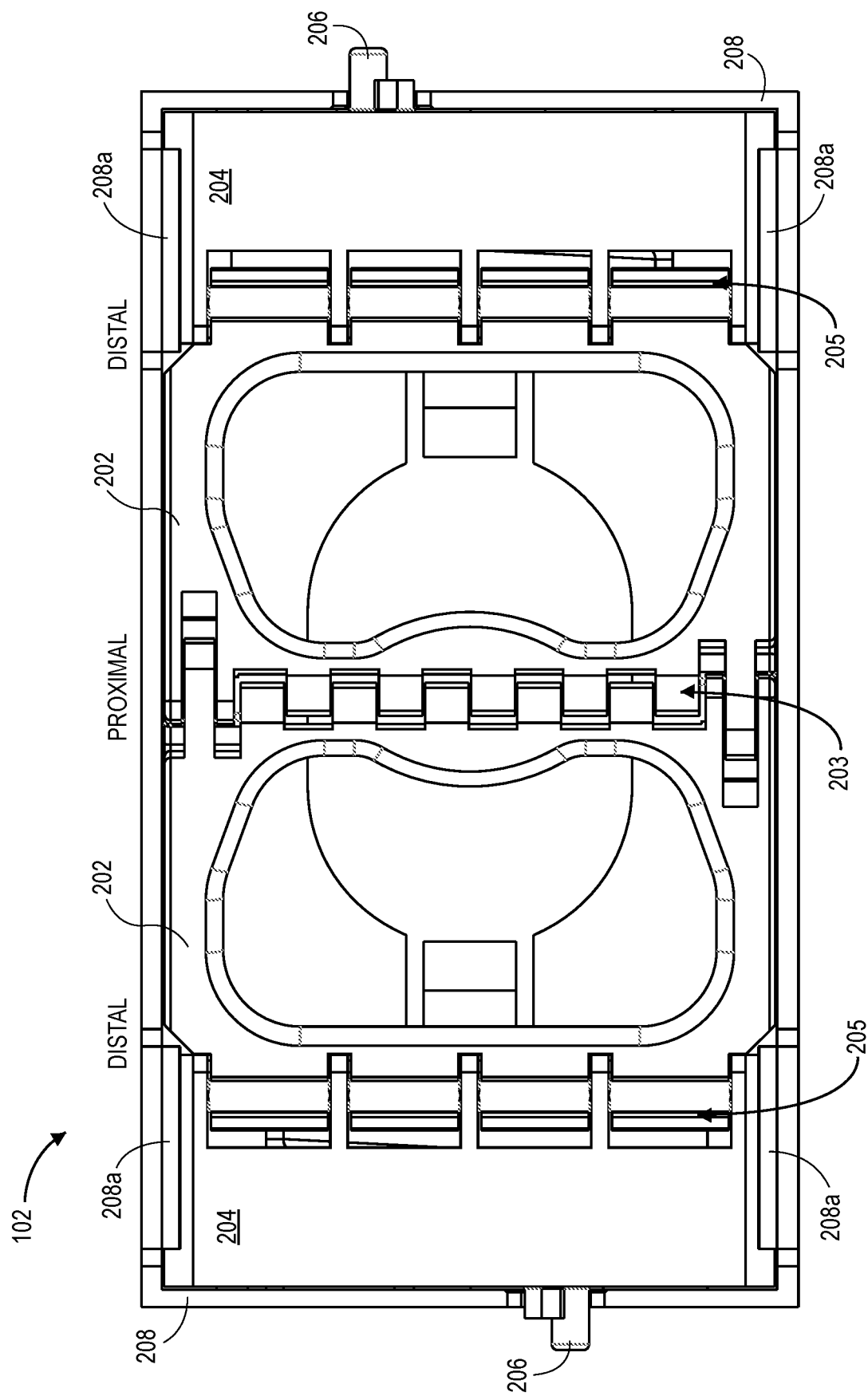
FIG. 2B is a top view illustrating the storage device carrier mechanism of FIG. 2A, according to an embodiment.

FIG. 2A is a perspective view illustrating a storage device carrier mechanism, and FIG. 2B is a top view illustrating the storage device carrier mechanism of FIG. 2A, both according to an embodiment. Thus, FIGS. 2A-2B further illustrate the carrier mechanism 102 of FIG. 1A.

Storage device carrier and latching mechanism 102 (or "storage device carrier mechanism 102" or simply "carrier mechanism 102") comprises a pair of rotatable handles 202, interlocked at a common first pivot 203 at a proximal end of each handle 202, wherein each handle 202 further comprises a respective second pivot 205 at a distal end of each handle 202, where the proximal and distal ends are so labeled. Carrier mechanism 102 further comprises a pair of translatable pin mechanisms 204 each coupled with the distal end of a respective handle 202, wherein each pin mechanism 204 comprises a latch pin 206 protruding therefrom, and a frame 208 with which each pin mechanism 204 is translatably coupled. Generally, the handles 202 (or the carrier mechanism 102 collectively) are configured such that, responsive to the common first pivot 203 being moved vertically away from the second pivots 205 (i.e., the handles 202 pulled upward), each pin mechanism 204 longitudinally translates (e.g., in a direction along the length of, or along the long axis of, the frame 208) inward within the frame 208 to place each corresponding latch pin 206 in a retracted position relative to the frame 208, a position or state described in more detail elsewhere herein.

Storage Device Carrier and Latching Mechanism-Operational States

Figure 3A:
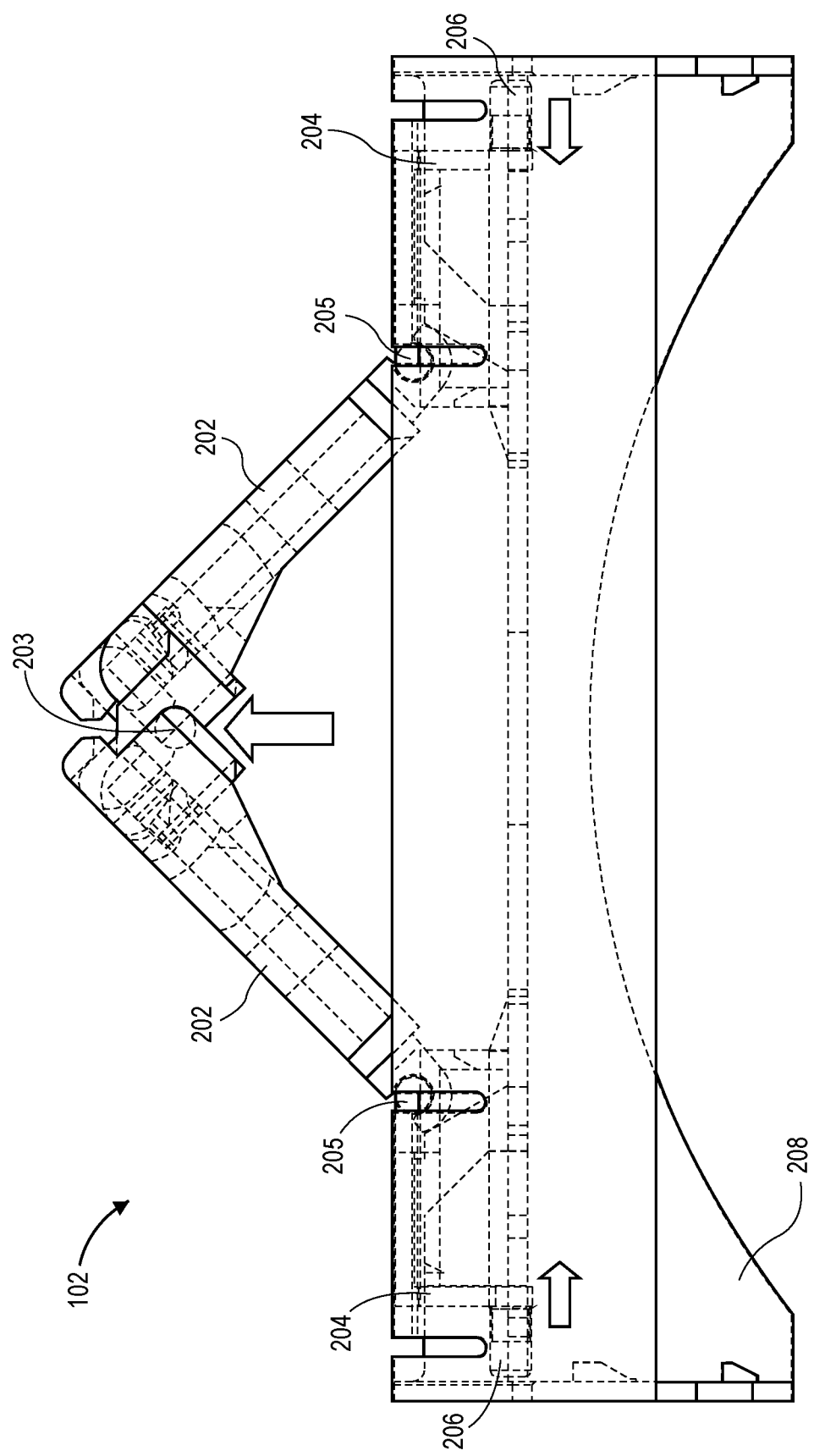
FIG. 3A is a side view illustrating the storage device carrier mechanism of FIG. 2A in a handling position, according to an embodiment.
Figure 3B:
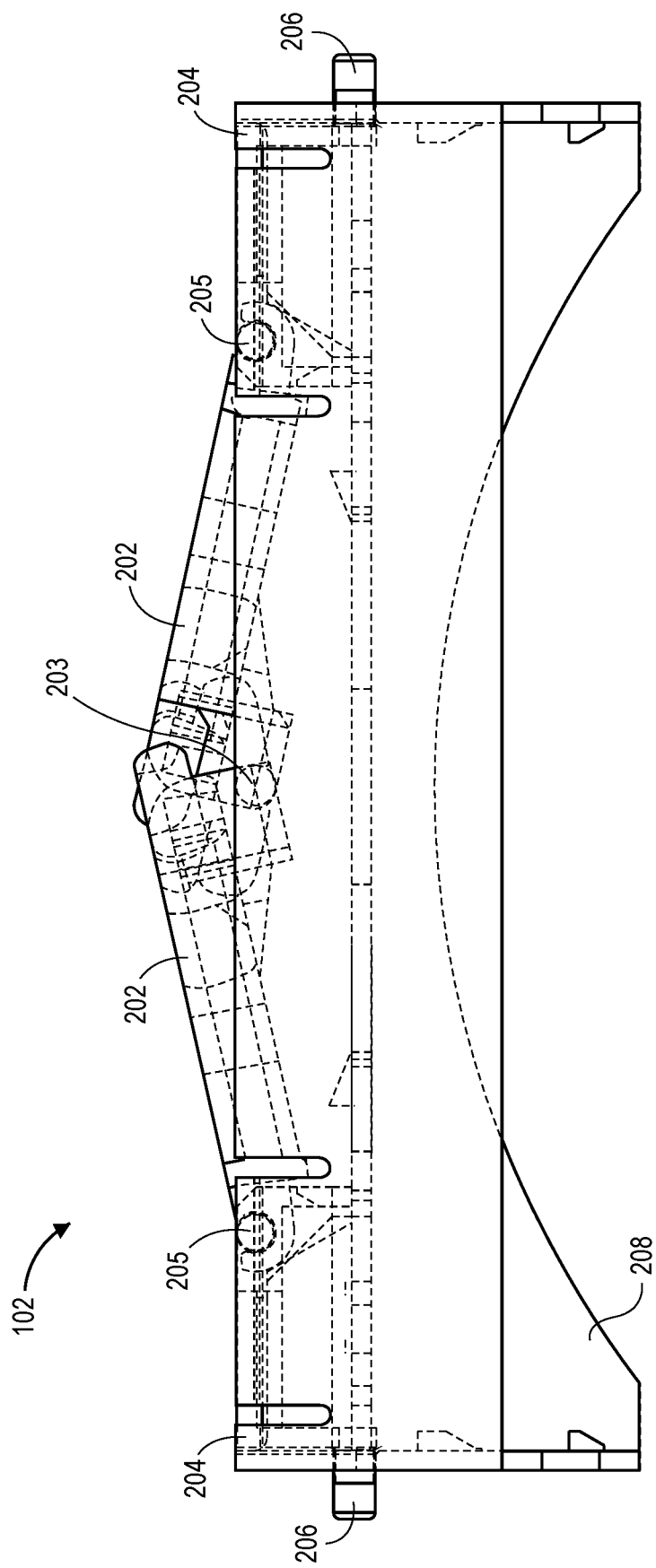
FIG. 3B is a side view illustrating the storage device carrier mechanism of FIG. 2A in a neutral position, according to an embodiment.
Figure 3C:
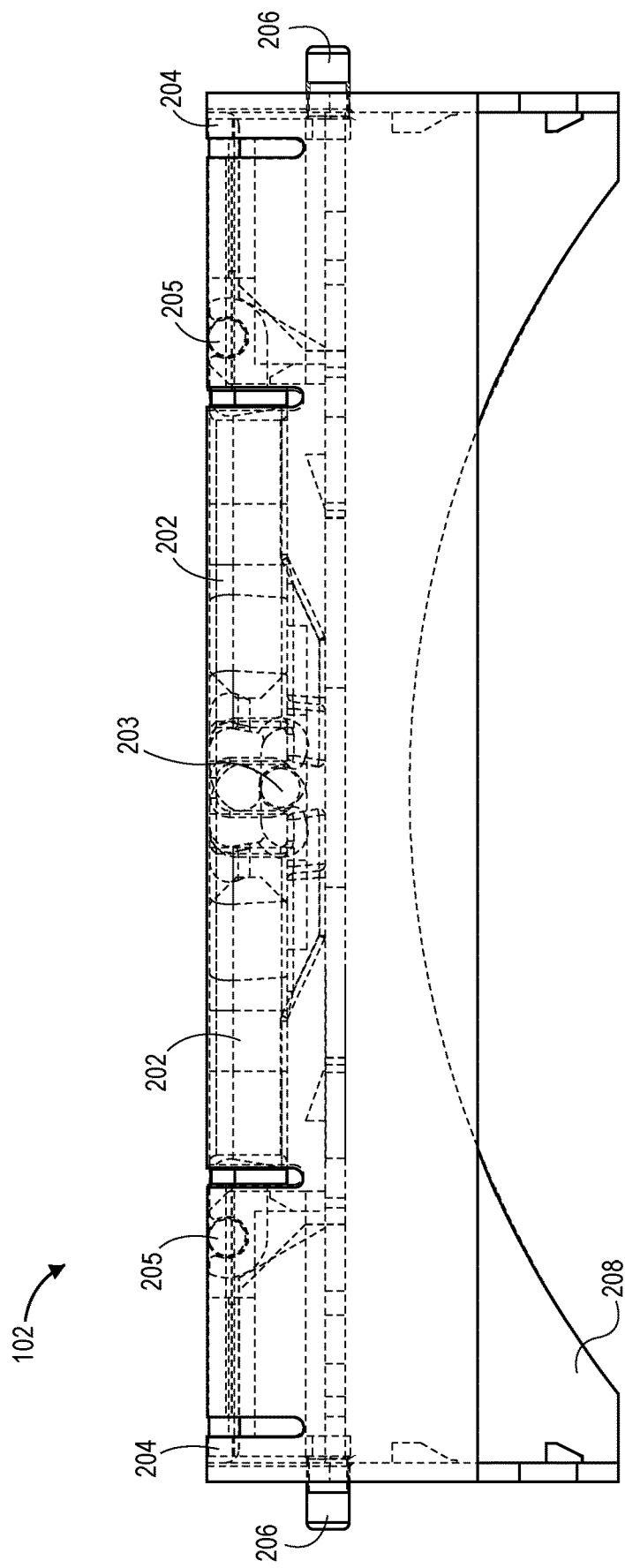
FIG. 3C is a side view illustrating the storage device carrier mechanism of FIG. 2A in a locked, over-center position, according to an embodiment.

FIG. 3A is a side view illustrating the storage device carrier mechanism of FIG. 2A in handling position, FIG. 3B is a side view illustrating the storage device carrier mechanism of FIG. 2A in a neutral position, and FIG. 3C is a side view illustrating the storage device carrier mechanism of FIG. 2A in a locked, over-center position, all according to embodiments. With respect to the functionality or operational capability of carrier mechanism 102, the mechanism is described as having three general states or relative component positions or states: (i) handling (or "install/removal") position, (ii) neutral (or "natural" or "relaxed") position, and (iii) locked (or "over-center") position. Generally, the handles 202, the pin mechanisms 204, and the frame 208 are cooperatively configured to operate as or similar to what is commonly referred to as an over-center mechanism (sometimes referred to as an over-center toggle).

FIG. 3A depicts what is referred to herein as a storage device "handling" state of the carrier mechanism 102, which corresponds to the common first pivot 203 being positioned, responsive to an upward handling force on the handles 202 (represented by vertical block arrow), substantially above the second pivots 205, with the latch pins 206 in a retracted position within the frame 208. Because each handle 202 is interlocked with a corresponding pin mechanism 204 at one of the second pivots 205, as the interlocked handles 202 are pulled upward, such as by a user/operator, each pin mechanism 204 resultantly moves or translates inward (represented by horizontal block arrows) within and toward the center the frame 208. Note that, according to an embodiment, each pin mechanism 204 is coupled with and held within the frame 208 such as during longitudinal translation by a pair of latch tabs 208a (FIGS. 2A-2B). Generally, a handling state is an expected position when a user is handling the storage device (see, e.g., storage device 104 of FIG. 1A), such as lifting, carrying, inserting, installing, removing, and the like.

FIG. 3B depicts what is referred to herein as a "neutral" state of the carrier mechanism 102, which corresponds to the common first pivot 203 being positioned slightly above the second pivots 205, with the latch pins 206 in an extended position extending external to the frame 208. According to an embodiment, because of the mechanical interaction between a spring mechanism (see, e.g., spring mechanism 208b of FIGS. 4, 5A) and a push-pin (see, e.g., push-pin 204a of FIG. 6), the carrier mechanism 102 is forced to return to the neutral state from the handling state when the handles 202 are no longer being acted upon, e.g., no longer being pulled up by a user/operator. As previously described in reference to assembly 100a (FIG. 1B), with a storage device assembly 100 (FIG. 1A) that may not be completely installed into a system enclosure such as system enclosure 112 (FIG. 1B), its latch pins 206 are not extended into respective receptacles of the system enclosure 112 but may be resting upon some structure of the system enclosure 112. Thus, in the neutral state the latch pins 206 may function to prohibit any assembly 100 from being dropped into a system enclosure such as when the carrier mechanism 102 is not being properly utilized.

FIG. 3C depicts what is referred to herein as a "locked" state of the carrier mechanism 102, which corresponds to the common first pivot 203 being substantially or nearly coplanar with the second pivots 205 with the latch pins 206 in the extended position. As with an over-center toggle (or over-center mechanism generally), with the handles 202 mechanically limited in the position depicted, including a positioning in which the common first pivot 203 may be slightly below the second pivots 205, the linkage system of fixed-length levers and pivots supply the action and clamping or locking force to hold the carrier mechanism 102 in place. Here, handles 202 may be vertically limited in the downward direction, for example, by the handle interlocking teeth 202a and hook 202b and pin 202c mechanisms (FIG. 4) and/or the interlocking hooks 202d of handle 202 and pins 204b of pin mechanism 204 (FIG. 4) and/or by the frame 208, with the common first pivot 203 being over-center (e.g., at or over "center", as in coplanar with the other pivots 205) and therefore in compression or longitudinally clamped, at least in part based on the outer walls of the frame 208 as well as possibly based on resisting structure external to the carrier mechanism 102 such as the divider assembly 112a (FIG. 1B) of storage system 112 (FIG. 1B) with which the latching pins 206 may be coupled, such that the carrier mechanism 102 effectively cannot move or unlock unless the linkage is moved. Thus here a storage device assembly 100, by way of the carrier mechanism 102, is able to be latched or locked into position in a storage system enclosure 112. However, with a relatively minimal upward pull on the handles 202, the assembly 100 can readily be returned to the handling state of FIG. 3A, whereby the latch pins 206 are retracted and disengaged from system enclosure 112, for removal and for further handling.

Storage Device Carrier and Latching Mechanism-Component Parts

Figure 4:
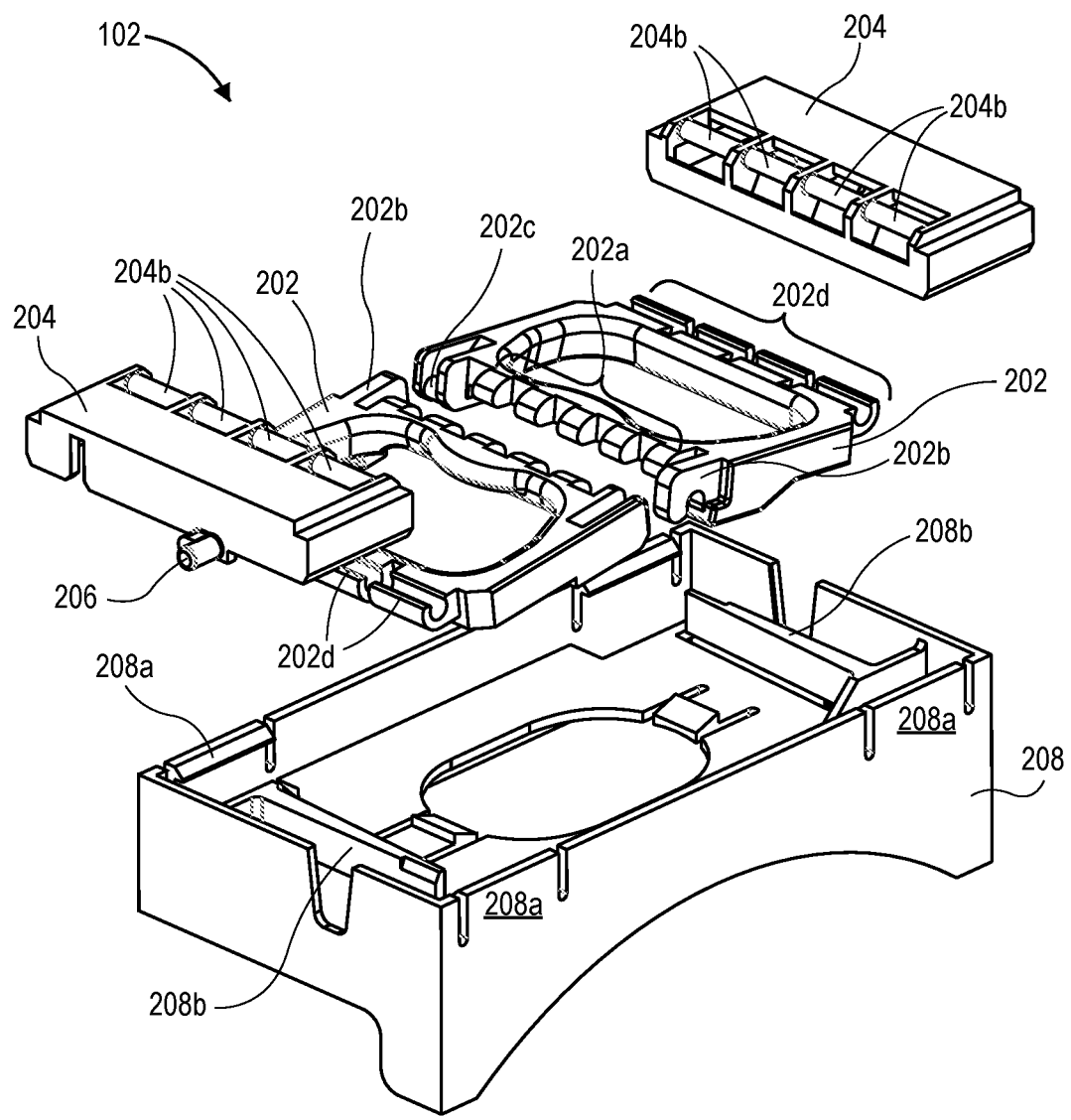
FIG. 4 is an exploded perspective view illustrating the storage device carrier mechanism of FIG. 2A, according to an embodiment.

FIG. 4 is an exploded perspective view illustrating the storage device carrier mechanism of FIG. 2A, according to an embodiment. Depicted here again is carrier mechanism 102 comprising the pair of handles 202 which are configured for interlocking, the corresponding pair of pin mechanisms 204 configured for interlocking or otherwise coupling with each of the handles 202 and each comprising at least one latch pin 206, where the number of latch pins 206 may vary from implementation to implementation, and the frame 208 to which each pin mechanism 204 is coupled such as by way of latch tabs 208a. Note that according to an embodiment carrier mechanism 102 comprises five components, but only three separate parts. Stated otherwise, each of the two handles 102 is identical (i.e., same part) and each of the pin mechanism 204 is identical (i.e., same part), thereby providing a cost advantage by way of part count efficiency. According to an embodiment, handles 202 are interlocked at pivot 203 (FIGS. 2A-2B) via a series of interlocking teeth 202a and hook 202b and pin 202c mechanisms. According to an embodiment, each handle 202 is interlocked or coupled with a corresponding pin mechanism 204 at a pivot 205 (FIGS. 2A-2B) via a series of interlocking hooks 202d of handle 202 and pins 204b of pin mechanism 204. Also visible within frame 208 are a pair of spring mechanisms 208b, the functionality of which is described in more detail elsewhere herein.

Figure 5A:
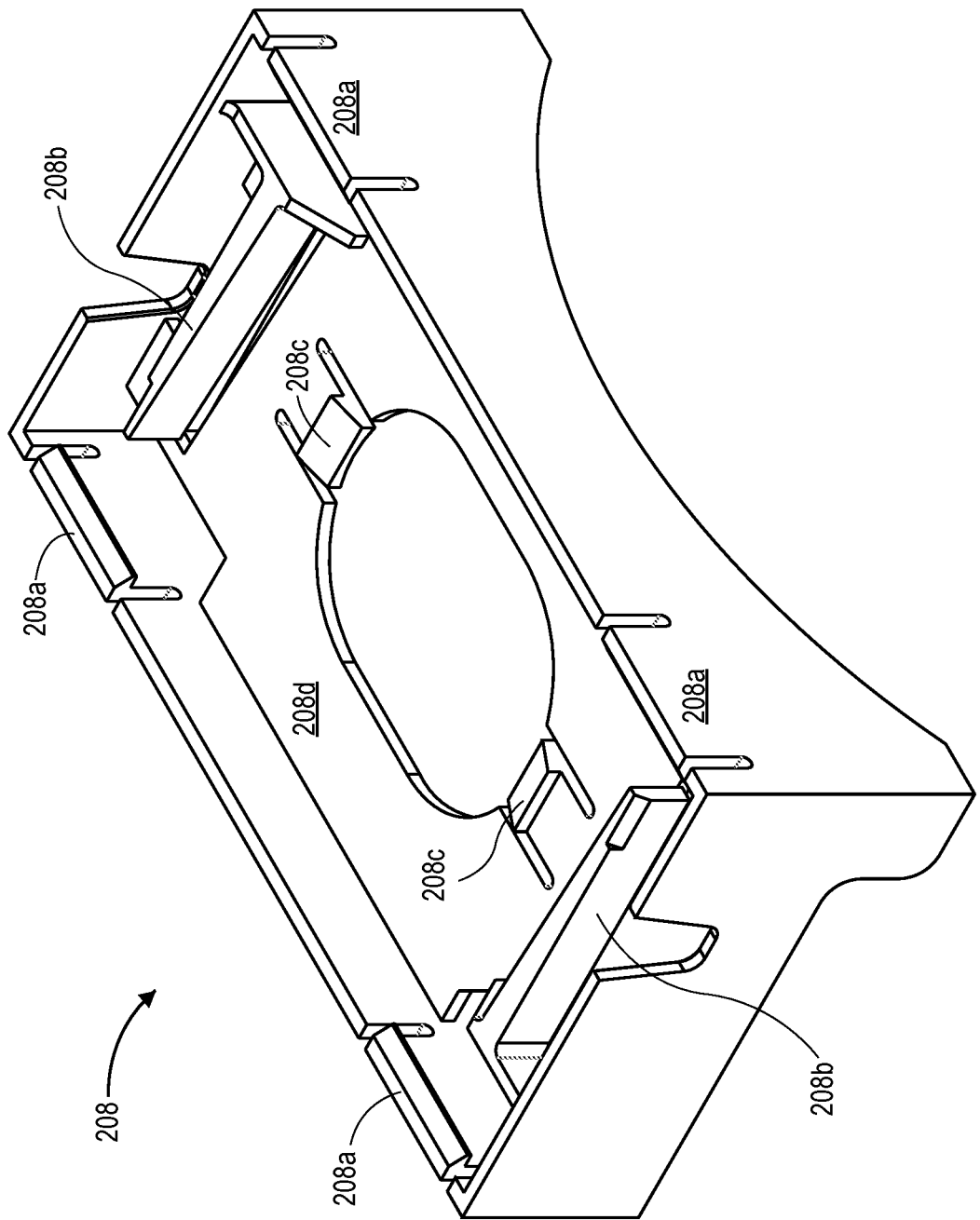
FIG. 5A is a top perspective view illustrating a frame of the storage device carrier mechanism of FIG. 2A, according to an embodiment.
Figure 5B:
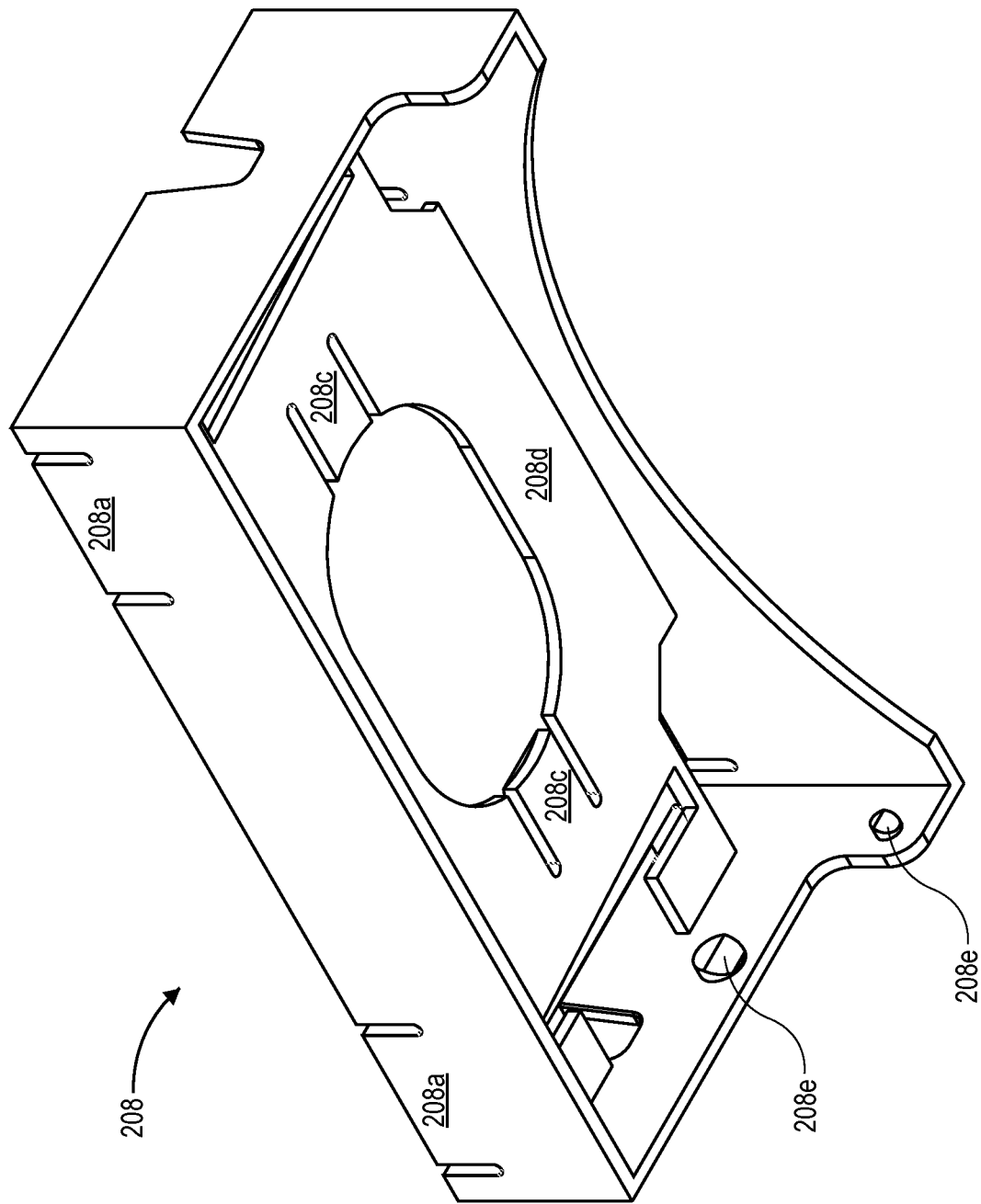
FIG. 5B is a bottom perspective view illustrating the frame of FIG. 5A, according to an embodiment.

FIG. 5A is a top perspective view illustrating a frame of the storage device carrier mechanism of FIG. 2A, and FIG. 5B is a bottom perspective view illustrating the frame of FIG. 5A, both according to embodiments. As previously described and according to an embodiment, frame 208 comprises the latch tabs 208a on each side for attaching each respective pin mechanism 204 (see, e.g., FIGS. 2A-2B, 4) and a pair of spring mechanisms 208b with one at each opposing longitudinal portion of frame 208. According to an embodiment, the spring mechanisms 208b are implemented as the type of spring referred to as a leaf spring. As discussed, a mechanical interaction between each spring mechanism 208b and a corresponding push-pin (see, e.g., push-pin 204a of FIG. 6) of each pin mechanism 204 provides a preload for the capability for the carrier mechanism 102 to automatically return to the neutral state from the handling state responsive to the handles 202 (see, e.g., FIGS. 2A-2B, 3B, 4) no longer being acted upon, e.g., being released. According to an embodiment, frame 208 further comprises a pair of limiters 208c (where the number of limiters 208c may vary from implementation to implementation) configured to limit the inward movement or translation of the pin mechanisms 204 within the frame, and a floor 208d configured to provide structural rigidity to frame 208 as well as to support the other component parts of carrier mechanism 102 (FIGS. 1A, 2A-4). Furthermore, the bottom perspective view of FIG. 5B shows one or more fixed attachment tabs 208e protruding inward from each of multiple sidewalls of frame 208 and configured for snapping together or otherwise attaching carrier mechanism 102 (FIG.

1A) to one end of a storage device 104 (FIG. 1A), such as by mating each attachment tab 208e with a corresponding receiving structure of the storage device 104.

Figure 6:
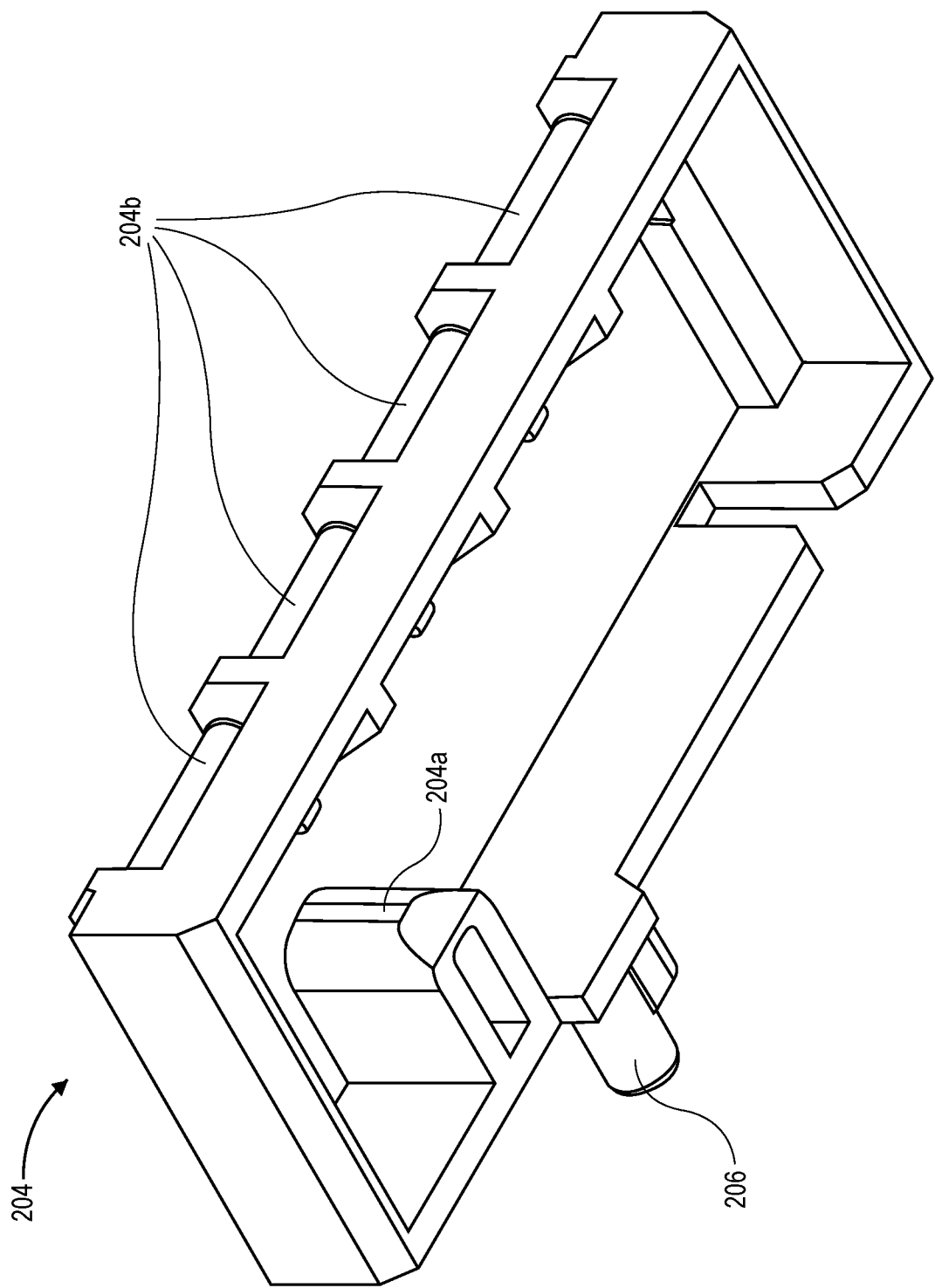
FIG. 6 is a bottom perspective view illustrating a pin mechanism of the storage device carrier mechanism of FIG. 2A, according to an embodiment.

FIG. 6 is a bottom perspective view illustrating a pin mechanism of the storage device carrier mechanism of FIG. 2A, according to an embodiment. As previously described and according to an embodiment, each pin mechanism 204 comprises an internal push-pin 204a protruding inwardly (longitudinally in the carrier mechanism 102 reference frame) configured to mechanically interact with (e.g., preload) a corresponding spring mechanism 208b (FIGS. 4, 5A) of frame 208 (FIGS. 2A-5B), so that the latch pins 206 of pin mechanism 204 are biased in extended position protruding outside of frame 208. As discussed, a mechanical interaction between each push-pin 204a of the pin mechanism 204 and a corresponding spring mechanism 208b of the frame 208 provides the capability for the carrier mechanism 102 to automatically return to the neutral state from the handling state responsive to the handles 202 (see, e.g., FIGS. 2A-2B, 3B, 4) no longer being acted upon. Also shown here are the pins 204b that interlock with corresponding hooks 202b of handle 202 (see, e.g., FIG. 4), and the latch pins 206 protruding from pin mechanism 204 and which are configured for operating to latch/unlatch or lock/unlock a storage device assembly 100 (FIGS. 1A-1B) into a system enclosure 112 (FIG. 1B) as described elsewhere herein.

Storage Device Carrier and Latching Mechanism-Spring Mechanism

Figure 7A:
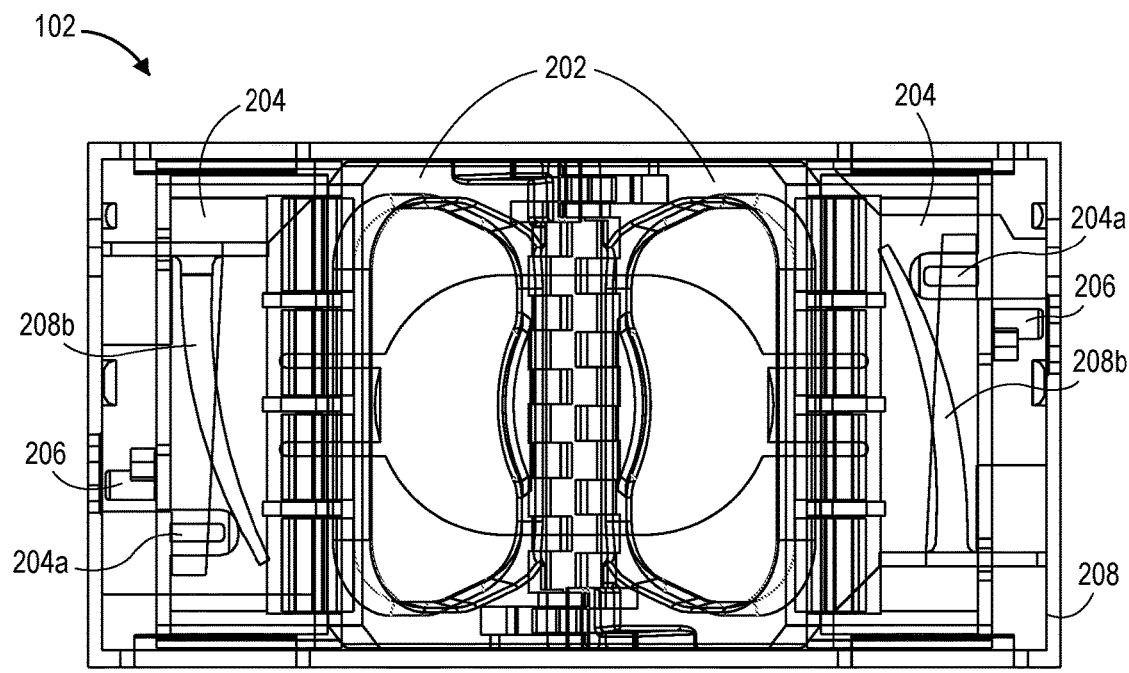
FIG. 7A is a top view illustrating the storage device carrier mechanism of FIG. 2A in a handling position, according to an embodiment.

FIG. 7A is a top view illustrating the storage device carrier mechanism of FIG. 2A in a handling position, according to an embodiment. As described, the storage device handling position of the carrier mechanism 102, depicted in FIG. 7A, corresponds to the common first pivot 203 being positioned responsive to an upward handling force on the handles 202 substantially above the second pivots 205, with the latch pins 206 in a retracted position within the frame 208 (see, e.g., FIG. 3A). As seen in the top view of FIG. 7A, each push-pin 204a of each pin mechanism 204 (see also, e.g., FIG. 6) is shown flexing, loading, compressing, or otherwise acting upon a corresponding spring mechanism 208b of the frame 208 (see also, e.g., FIG. 5A), responsive to an upward handling force on the handles 202. Thus, responsive to the handles 202 being released, each spring mechanism 208b responsively unflexes, unloads, springs back, or otherwise returns to its neutral largely unloaded state (or "substantially unloaded"), thereby returning carrier mechanism 102 to its neutral state (see, e.g., FIG. 3B).

Figure 7B:
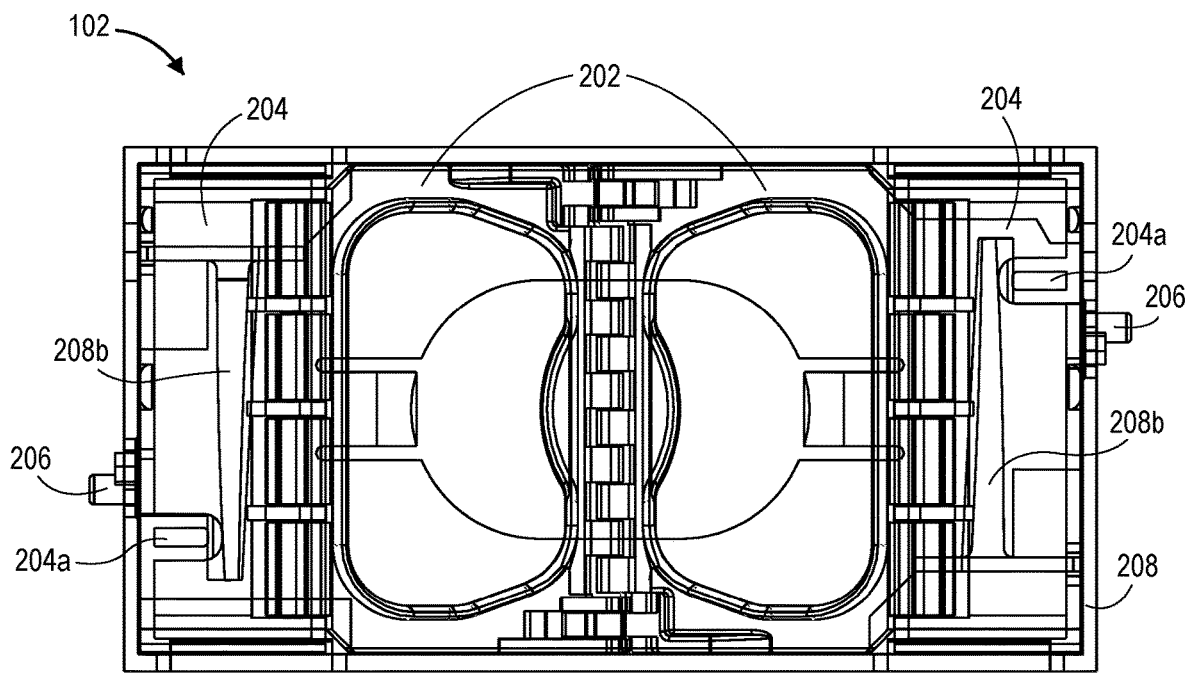
FIG. 7B is a top view illustrating the storage device carrier mechanism of FIG. 2A in a locked, over-center position, according to an embodiment.

FIG. 7B is a top view illustrating the storage device carrier mechanism of FIG. 2A in a locked, over-center position, according to an embodiment. As described, the locked state of the carrier mechanism 102, depicted in FIG. 7B, corresponds to the common first pivot 203 being substantially or nearly coplanar with the second pivots 205 with the latch pins 206 in the extended position (see, e.g., FIG. 3C). As seen in the top view of FIG. 7B, each push-pin 204a of each pin mechanism 204, and each corresponding spring mechanism 208b of the frame 208, is shown unflexed or largely unloaded (here again, or "substantially unloaded"), with the over-center clamping or locking force holding the carrier mechanism 102 in the locked state. With each push-pin 204a and corresponding spring mechanism 208b being largely unloaded while carrier mechanism 102 is in the locked state, these components preferably will not be applying any force (or applying only negligible force, at most) so that these components will not cause the handles 202 to inadvertently unlatch and release the storage device 104 (FIG. 1A) during shock or vibration events. Thus, in this position a storage device assembly 100 (FIG. 1A), by way of the carrier mechanism 102, is able to be latched or locked into position in a storage system enclosure 112 (FIG. 1B). However, with a relatively minimal upward pull on the handles 202, the assembly 100 can readily be returned to the neutral state and/or the handling state of FIG. 7A, whereby the latch pins 206 are retracted and disengaged from system enclosure 112.

Method of Using a Storage Device Carrier and Latching Mechanism

FIG. 8 is a flow diagram illustrating a method of using a carrier and latching mechanism attached to a storage device, according to an embodiment. For example, the method of FIG. 8 may be used to operate a carrier and latching mechanism attached to a storage device, wherein the carrier and latching mechanism includes a pair of rotatable handles interlocked at a common first pivot at a proximal end of each handle with each handle comprising a respective second pivot at a distal end, a pair of translatable pin mechanisms each coupled with the distal end of a respective handle and comprising a latch pin protruding longitudinally therefrom, and a frame with which each pin mechanism is translatably coupled, such as carrier mechanism 102 (see, e.g., FIGS. 2A-2B) illustrated and described herein throughout.

At block 802, apply an upward handling force to the handles thereby moving the carrier and latching mechanism to a device handling state corresponding to the common first pivot being positioned substantially above the second pivots with the latch pins in a retracted position within the frame. For example, an upward handling force is applied (e.g., by a user/operator) to the interlocked handles 202 (FIGS. 2A-2B, 4), thereby moving the carrier mechanism 102 (FIGS. 1, 2A-2B, 4) to a device handling state (see, e.g., FIG. 3A) corresponding to the common first pivot 203 (FIGS. 2A-2B) being positioned substantially above the second pivots 205 (FIGS. 2A-2B), with the latch pins 206 (FIGS. 2A-2B, 4, 6) in a retracted position within the frame 208 (FIGS. 2A-2B, 4, 5A-5B).

At block 804, position the storage device with the attached carrier and latching mechanism over an installation slot of a storage system. For example, the storage device 104 (FIG. 1A) with the attached carrier mechanism 102, e.g., assembly 100 (FIGS. 1A-1B), is positioned over an installation slot 113 (FIG. 1B) of a storage system enclosure 112 (FIG. 1B).

At block 806, lower the storage device into the installation slot until connected to the installation slot. For example, the assembly 100 is lowered into the installation slot 113 of a storage system enclosure 112 to mechanically and electrically connect mating electrical connectors.

At block 808, release the handles thereby moving the carrier and latching mechanism to a neutral state corresponding to the common first pivot being positioned above the second pivots with the latch pins in an extended position extending external to the frame. For example, the handles 202 are released thereby moving the carrier mechanism 102 to a neutral state (see, e.g., FIG. 3B) corresponding to the common first pivot 203 being positioned above the second pivots 205 with the latch pins 206 in an extended position extending external to the frame 208. According to an embodiment, releasing the handles 202 includes releasing at least in part a spring load between each push-pin 204a (FIG.

6) of each pin mechanism 204 and a corresponding spring 208b (FIGS. 4, 5A) of the frame 208, thereby moving the carrier mechanism 102 to the neutral state.

At block 810, apply a downward locking force to the handles in the neutral state thereby moving the carrier and latching mechanism to a locked over-center state corresponding to the common first pivot being substantially or nearly coplanar with the second pivots, in which the handles are constrained from further mechanical movement downward and longitudinally compressed at least in part by outer walls of the frame, and with the latch pins in the extended position. For example, a downward locking force is applied to the handles 202 in the neutral state, thereby moving the carrier mechanism 102 to a locked over-center state (see, e.g., FIG. 3C) corresponding to the common first pivot 203 being substantially or nearly coplanar with the second pivots 205, in which the handles 202 are constrained from further mechanical movement downward and longitudinally compressed at least in part by outer walls of the frame 208, and with the latch pins 206 in the extended position. As described elsewhere herein, the linkage system of fixed-length levers and pivots of carrier mechanism 102 supply the action and clamping or locking force to hold the carrier mechanism 102 in place. For example, based on the mechanism design the handles 202 may be mechanically limited in the downward direction by the handle interlocking teeth 202a and hook 202b and pin 202c mechanisms (FIG. 4) and/or the interlocking hooks 202d of handle 202 and pins 204b of pin mechanism 204 (FIG. 4) and/or by the frame 208. Thus, the common first pivot 203 is at or over "center" and the handles 202 are in compression, at least in part based on the outer walls of the frame 208 as well as possibly based on resisting structure external to the carrier mechanism 102 in which the latching pins 206 may be inserted, such that carrier mechanism 102 effectively cannot move or unlock unless the handles 202 are moved.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A storage device carrier mechanism comprising:
a pair of same rotatable handles interlocked via interlocking hook and pin mechanisms at a common first pivot at a longitudinally proximal end of each handle, wherein each handle comprises a respective second pivot at a longitudinally distal end of each handle;
a pair of translatable pin mechanisms each coupled with the distal end of a respective handle via interlocking pins and hooks, wherein each pin mechanism comprises a latch pin protruding therefrom and a longitudinally extending push-pin positioned on a bottom side and configured to mechanically interact with a corresponding leaf spring mechanism of a frame to preload the corresponding latch pin to an extended position extending external to the frame; and
the frame with which each pin mechanism is translatably coupled and in which the pair of handles and the pair of pin mechanisms is each configured to vertically recess, wherein the frame comprises a pair of the leaf spring mechanisms positioned on a top side at opposing longitudinal portions of the frame and configured to mechanically interact with the corresponding push-pin of the pin mechanism;
wherein the handles are configured such that, responsive to the common first pivot moving vertically away from the second pivots, each pin mechanism longitudinally translates inward within the frame to place each corresponding latch pin in a retracted position relative to the frame.

2. The storage device carrier mechanism of claim 1, wherein the handles, the pin mechanisms, and the frame are cooperatively configured as an over-center mechanism such that (i) a device handling state corresponds to the common first pivot being positioned, responsive to an upward handling force, substantially above the second pivots with the latch pins in a retracted position within the frame, (ii) a neutral state corresponds to the common first pivot being positioned slightly above the second pivots with the latch pins in an extended position extending external to the frame, and (iii) a locked over-center state corresponds to the common first pivot being substantially or nearly coplanar with the second pivots with the latch pins in the extended position.

3. The storage device carrier mechanism of claim 2, wherein:
in the device handling state, the push-pin of each pin mechanism is configured to load the respective leaf spring mechanism of the frame thereby causing return of the over-center mechanism to the neutral state responsive to elimination of the handling force.

4. The storage device carrier mechanism of claim 3, wherein:
the over-center mechanism is configured to move, responsive to a downward locking force to the handles in the neutral state, to the locked over-center state in which the handles are vertically downward mechanically limited and longitudinally clamped at least in part by outer walls of the frame.

5. The storage device carrier mechanism of claim 1, wherein the frame comprises means for attaching the carrier mechanism to a storage device.

6. The storage device carrier mechanism of claim 1, wherein each rotatable handle of the pair of rotatable handles is manufactured in a same manner.

7. The storage device carrier mechanism of claim 1, wherein each pin mechanism of the pair of pin mechanisms is manufactured in a same manner.

8. A method of using a carrier and latching mechanism attached to a storage device,
wherein the carrier and latching mechanism comprises:
a pair of same rotatable handles interlocked via interlocking hook and pin mechanisms at a common first pivot at a proximal end of each handle with each handle comprising a respective second pivot at a distal end,
a pair of translatable pin mechanisms each coupled with the distal end of a respective handle via interlocking pins and hooks and comprising a latch pin protruding longitudinally therefrom and a longitudinally extending push-pin positioned on a bottom side and configured to mechanically interact with a corresponding leaf spring mechanism of a frame to preload the corresponding latch pin to an extended position extending external to the frame, and
the frame with which each pin mechanism is translatably coupled and in which the pair of handles and the pair of pin mechanisms is each configured to vertically recess;
the method comprising:
applying an upward handling force to the handles thereby moving the carrier and latching mechanism to a device handling state corresponding to the common first pivot being positioned substantially above the second pivots with the latch pins in a retracted position within the frame.

9. The method of claim 8, further comprising:
positioning the storage device with the attached carrier and latching mechanism over an installation slot of a storage system enclosure;
lowering the storage device into the installation slot until connected to the enclosure; and
releasing the handles thereby moving the carrier and latching mechanism to a neutral state corresponding to the common first pivot being positioned above the second pivots with the latch pins in an extended position extending external to the frame.

10. The method of claim 9, wherein releasing the handles includes releasing at least in part a spring load between each push-pin of each pin mechanism and the corresponding leaf spring mechanism of the frame thereby moving the carrier and latching mechanism to the neutral state.

11. The method of claim 9, further comprising:
applying a downward locking force to the handles in the neutral state thereby moving the carrier and latching mechanism to a locked over-center state corresponding to the common first pivot being substantially or nearly coplanar with the second pivots, in which the handles are constrained from further mechanical movement downward and are longitudinally compressed at least in part by outer walls of the frame, and with the latch pins in the extended position.

12. The method of claim 8, wherein each rotatable handle of the pair of rotatable handles of the carrier and latching mechanism is manufactured according to a same manufacturing process.

13. The method of claim 8, wherein each pin mechanism of the pair of pin mechanisms of the carrier and latching mechanism is manufactured according to a same manufacturing process.

14. A hard disk drive assembly comprising:
a hard disk drive (HDD); and
a carrier and latching mechanism attached to the HDD via means for attaching,
the carrier and latching mechanism comprising:
a pair of same rotatable handles interlocked via interlocking hook and pin mechanisms at a common first pivot at a proximal end of each handle, wherein each handle comprises a respective second pivot at a distal end of each handle,
a pair of translatable pin mechanisms each coupled with the distal end of a respective handle via interlocking pins and hooks, wherein each pin mechanism comprises a latch pin protruding therefrom and a longitudinally extending push-pin positioned on a bottom side and configured to mechanically interact with a corresponding leaf spring mechanism of a frame to preload the corresponding latch pin to an extended position extending external to the frame, and
the frame with which each pin mechanism is translatably coupled and in which the pair of handles and the pair of pin mechanisms is each configured to vertically recess, wherein the frame comprises a pair of the leaf spring mechanisms positioned on a top side at opposing longitudinal portions of the frame and configured to mechanically interact with the corresponding push-pin of the pin mechanism,
wherein the handles are configured such that, responsive to the common first pivot moving vertically away from the second pivots, each pin mechanism longitudinally translates inward within the frame to place each corresponding latch pin in a retracted position relative to the frame.

15. The hard disk drive assembly of claim 14, wherein the frame comprises at least one inward protrusion, on opposing sides of the frame, positioned to mate with a corresponding receiving feature on the HDD to attach the carrier and latching mechanism to the HDD.

16. The hard disk drive assembly of claim 14, wherein the handles, the pin mechanisms, and the frame are cooperatively configured as an over-center mechanism such that (i) a device handling state corresponds to the common first pivot being positioned, responsive to an upward handling force, substantially above the second pivots with the latch pins in a retracted position within the frame, (ii) a neutral state corresponds to the common first pivot being positioned slightly above the second pivots with the latch pins in an extended position extending external to the frame, and (iii) a locked over-center state corresponds to the common first pivot being substantially or nearly coplanar with the second pivots with the latch pins in the extended position.

17. The hard disk drive assembly of claim 16, wherein:
in the device handling state, the push-pin of each pin mechanism is configured to load the respective leaf spring mechanism of the frame thereby causing return of the over-center mechanism to the neutral state responsive to elimination of the handling force.

18. The hard disk drive assembly of claim 17, wherein:
the over-center mechanism is configured to move, responsive to a downward locking force to the handles in the neutral state, to the locked over-center state in which the handles are vertically downward mechanically limited and longitudinally clamped at least in part by outer walls of the frame.

19. The hard disk drive assembly of claim 14, wherein each rotatable handle of the pair of rotatable handles of the carrier and latching mechanism is a substantially identical part.

20. The hard disk drive assembly of claim 14, wherein each pin mechanism of the pair of pin mechanisms of the carrier and latching mechanism is a substantially identical part.

* * * * *